Feb. 28, 1950     S. PILE     2,498,843
LOCKING DEVICE IN IRREVERSIBLE TRANSMISSIONS
Filed Feb. 24, 1948
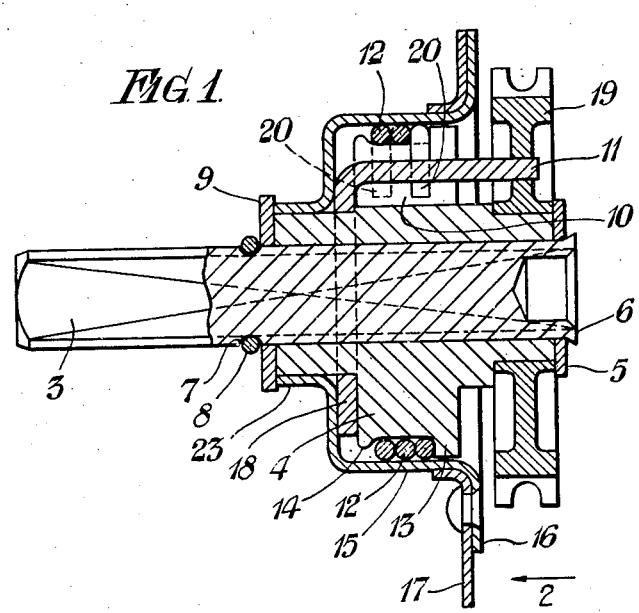
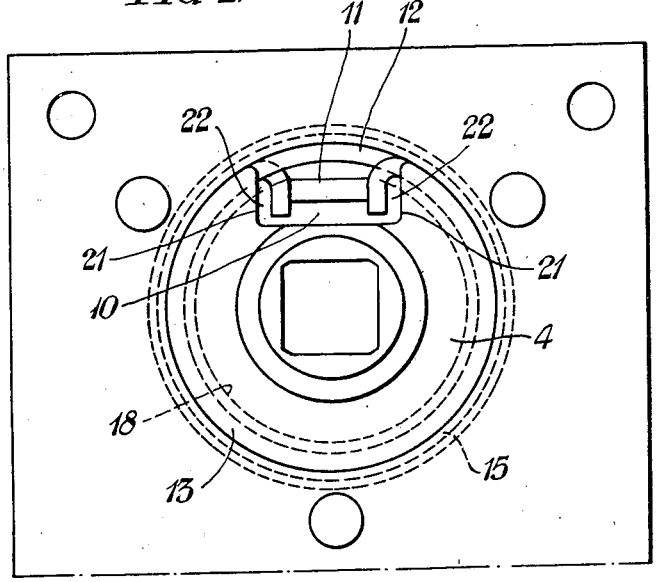
Inventor:
Sydney Pile,
by Singer, Ehlert, Stern & Carlberg
Attorneys.

Patented Feb. 28, 1950

2,498,843

UNITED STATES PATENT OFFICE 2,498,843

LOCKING DEVICE IN IRREVERSIBLE TRANSMISSIONS

Sydney Pile, London, England, assignor to Teleflex Products Limited, London, England, a British company Application February 24, 1948, Serial No. 10,414
In Great Britain July 16, 1946

Section 1, Public Law 690, August 8, 1946
Patent expires July 16, 1966

2 Claims. (Cl. 192—8)

This invention relates to locking devices in irreversible transmissions of the type in which a driving spindle has a hub turning therewith located within a fixed cylindrical housing around which hub is mounted a helical spring normally in elastic frictional engagement with the interior surface of the housing, the said spring having circumferentially spaced inwardly turned ends projecting with a desired circumferential clearance into a radial and axially extending slot of desired width in the surface of the hub, together with a coaxial wheel to be driven, freely mounted on the hub or an extension thereof, the said wheel or a part turning therewith having an axially extending eccentrically arranged "dog" which passes between the inwardly turned ends of the spring, the arrangement being such that when the driving spindle is turned in either direction of rotation one or the other of the somewhat radial bounding surfaces of the slot is forcibly pressed against the adjacent inwardly turned end of the spring to loosen the grip of the spring from the housing and permit the parts to be turned relatively to the fixed housing, the "dog" and the wheel to be driven being carried round between the two ends of the spring, whilst any return or reaction drive from the wheel to be driven is imparted to the "dog" which forcibly is pressed against the other or inner side of either of the inwardly projecting ends of the spring to increase the frictional grip of the spring in the housing and prevent rotation.

Such locking devices are well known, particularly in connection with raising and lowering gear for sliding sash windows, especially such windows for motor road and like vehicles, whereby after positioning such windows the reaction, by effecting the locking, holds the parts in any adjusted position. Further, in such known locking devices in some cases the spring has had down-turned ends which are engaged by a driving member.

A locking device of the type set forth in accordance with the invention has the dog formed in one with a plate which comes at right angles thereto and is mounted around the hub towards one end thereof, whilst the free end of the dog engages in a circumferential notch in the wheel to be driven which is mounted around the hub at the other end. In this manner as the two ends of the dog are integral or made integral with and carried by parts rotatably mounted on the hub it will be realized the dog has a balanced action.

In a preferred construction the driving spindle is non-circular in cross section and engages in a correspondingly shaped bore in the hub. One end of the hub has the driven wheel mounted thereon which is maintained in position by a washer, whilst the end of the spindle is riveted over to hold the washer in position. The housing, which preferably is outwardly flanged for connection to a carrying plate (which may be part of the framework of a door or body part of a motor road vehicle), has a reduced portion surrounding the other end of the hub and a washer is provided to maintain the hub in position in the housing, this washer in turn being held in position by a circumferential spring clip held in a groove around the spindle.

In the result, the whole assembly does not necessitate any welding or otherwise but all the parts interfit ready for easy assembly by unskilled labour.

In order that the invention may be better understood, it will now be described with reference to the accompanying drawings, which are to a scale above full size, which are given by way of example only and in which:

Fig. 1 is a cross sectional elevation of one form of locking device and driven wheel in accordance with the invention, and Fig. 2 an end elevation in the direction of the arrow 2, with the spindle, washers and driven wheel removed.

In carrying the invention into effect as shown in the drawings, there is provided a spindle 3 of square section adapted to be assembled with and in a hub 4, having a square section bore, in which the spindle engages. This spindle 3 has the corners rounded and passes through a similarly shaped bore in the hub 4 and is secured in said hub by a washer 5 constituting a flange at one end held in position by the spindle 3 being riveted over at 6, and at the other end, upon assembly, by a circumferential notch 7 or portions thereof engaged by a detachable circumferential spring wire clip 8 and washer 9 to secure the parts assembled.

The hub 4 comprises a stepped body with its enlarged part radially and axially slotted at 10 for the passage of the driving dog 11 (hereafter referred to) and having on its larger diametered portion the locking spring 12 axially and otherwise held by an end flange 13 and a bead 14. The whole is mounted in a sheet metal pressed housing 15 coming around the hub 4 by a reduced portion 23 at one end which abuts the washer 9 and outwardly flanged at 16 at the other end for securing to the carrying means such as, for example, a plate 17 for attachment to the framework of a door of a motor vehicle or otherwise, or actually directly to the framework of such door or the like; in some cases the housing and plate may be integral.

Between the reduced end 23 of the housing and the hub proper 4 there is mounted, around the hub proper, a driving plate 18 which has the dog 11, bent at right angles thereto and extending through the radial and axial slot 10 of the hub. This dog 11 is comprised of a tongue of desired width which as bent comes parallel with the axis of the spindle and at a desired radial distance therefrom. At the other end, on the hub 4, there is mounted a driven wheel 19, axially held in position by the outer flange comprised by the washer 5 on the spindle and having a circumferential notch in its web to receive and for the passage of the outer end of the driving dog 11 of the driving plate 18, to give a balanced action to such dog.

The locking spring 12 has three helical turns and it terminates in downturned portions 20 which enter the slot 10 of the hub. The spring 12 tends to expand on the hub 4 and the relative dimensions of the parts are such that when the hub 4 surrounded by the spring 12 is inserted into the housing 15, the exterior of the turns of the spring fits and comes into elastic frictional engagement with the housing and spaces the downturned ends 20 from the boundaries 21 of the slot 10, the spaces being numbered 22. Moreover, when thus positioned the two ends 20 just abut the edges of the tongue-like driving dog 11. The position of the parts is shown in Fig. 2.

From the above it will be appreciated that when the spindle is turned (no matter in which direction) it carries round with it the hub 4 and spring 12. Consequently, the ends 20 also carry round the dog 11, which being mounted on the hub also tends to turn therewith. The dog 11 drives round the wheel 19 which latter being mounted on the hub also tends to turn therewith. The spring 12 does not prevent driving movement from the spindle in either direction.

However, any reaction movement, that is, any attempt of the driven wheel 19 to turn the hub and spindle, is prevented. In the first place the said wheel 19 tends to turn on the hub 4 and carry the dog 11 with it. This action immediately is imparted to the one or the other of the ends 20 of the spring 12 (depending on the direction of movement); which tends to expand the spring causing it to bind against the inner surface of the housing 15 to stop or prevent the movement due to reaction.

The spindle 3 extends through any suitable associated part (for example, a part of the framework of a door of a motor road vehicle) to be engaged by a driving handle or the like, so that when driven by said handle in either direction it drives the wheel 19 through the hub 4 and thereby the spring grip of the hub in the interior of the housing is freed, permitting the driving in either direction. However, on the cessation of the drive the helical spring means 12 as before explained comes into binding engagement with the interior of the housing 15 and this binding engagement is increased by the reaction of the set driven part (for example, the window) through the driven wheel; in this manner the locking device holds said set part in its set adjusted position.

In a particular application of the invention, for example as associated with the raising and lowering gear of my application Serial No. 10,413, there is associated with the spindle, locking device and wheel to be driven, an adjustably positioned guide wheel for a driven cable. This guide wheel may be mounted upon the carrying plate of the locking device and spindle housing or upon that part of the framework carrying such locking device and spindle housing.

Although a locking device in accordance with the invention has been particularly described as associated with manual driving means, it should be understood that it equally well can be used with electric or other power drives.

What I claim and desire to secure by Letters Patent of the United States of America is:

1. In a device of the character described, a fixedly mounted housing having a cylindrical wall, a driving spindle rotatably mounted in said housing and having a hub secured thereto so as to rotate with said spindle, said hub being provided with a radial slot in its outer circumference, a helical spring surrounding said hub and having its ends bent inwardly into said slot, said spring engaging resiliently with its outer circumference the inner face of the cylindrical wall of said housing, a driven wheel having a circumferential notch mounted freely rotatable at one end of said hub, and a dog integrally formed with a plate bent at right angles thereto, said plate being mounted on the other end of said hub and said dog extending through said radial slot in said hub and between the inwardly turned ends of said helical spring, the free end of said dog engaging the notch in said driven wheel.

2. A device as claimed in claim 1 in which the driven wheel is maintained in position on the hub by a washer itself maintained in position by riveting over the end of the spindle, while the fixed housing has a reduced portion surrounding the other end of the hub, and including another washer on the spindle to maintain the hub in position on the housing, the washer in turn being maintained in position by a circumferential spring clip held in a groove surrounding the spindle.

SYDNEY PILE.

REFERENCES CITED

The following references are of record in the file of this patent:

UNITED STATES PATENTS

| Number | Name | Date |
|---|---|---|
| Re. 16,565 | Meyers | Mar. 1, 1927 |
| 1,651,052 | Ackerman et al. | Nov. 29, 1927 |
| 1,942,962 | Hart | Jan. 9, 1934 |
| 1,965,878 | Briggs | July 10, 1934 |
| 2,001,758 | Zwierzina | May 21, 1935 |